(12) United States Patent
Yamamoto et al.

(10) Patent No.: US 10,190,626 B2
(45) Date of Patent: Jan. 29, 2019

(54) THRUST ROLLER BEARING CAGE AND METHOD FOR MANUFACTURING THE SAME

(71) Applicant: NTN CORPORATION, Osaka (JP)

(72) Inventors: Kazuyuki Yamamoto, Shizuoka (JP); Hisataka Hasegawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/523,413

(22) PCT Filed: Nov. 6, 2015

(86) PCT No.: PCT/JP2015/081275
§ 371 (c)(1),
(2) Date: May 1, 2017

(87) PCT Pub. No.: WO2016/080210
PCT Pub. Date: May 26, 2016

(65) Prior Publication Data
US 2017/0307018 A1   Oct. 26, 2017

(30) Foreign Application Priority Data

Nov. 18, 2014 (JP) ................................. 2014-233493
Dec. 15, 2014 (JP) ................................. 2014-253274
(Continued)

(51) Int. Cl.
*F16C 19/46* (2006.01)
*F16C 33/54* (2006.01)
(Continued)

(52) U.S. Cl.
CPC ............ *F16C 19/463* (2013.01); *B21D 53/12* (2013.01); *F16C 19/305* (2013.01);
(Continued)

(58) Field of Classification Search
CPC ............................ F16C 33/546; F16C 19/305
See application file for complete search history.

(56) References Cited

U.S. PATENT DOCUMENTS 2,978,282 A   4/1961   Fisher
3,240,542 A   3/1966   Jahn
(Continued)

FOREIGN PATENT DOCUMENTS

CN   101600891   12/2009
CN   102869893   1/2013
(Continued)

OTHER PUBLICATIONS

Machine Translation of JP 2008-2503.*
Jianguo Lu et al., "China Electrical Canon", vol. 11, Feb. 28, 2009.

*Primary Examiner* — Thomas R Hannon
(74) *Attorney, Agent, or Firm* — Clark & Brody

(57) ABSTRACT

A thrust roller bearing cage (11) a thrust roller bearing (20) and a plurality of pockets (21) accommodating rollers (13). The thrust roller bearing cage (11) includes: a radially outer area bent portion (41) formed by bending an area located radially outside the pockets (21) inward in a radial direction; and projecting portions (44) that are formed in a tip end of the radially outer area bent portion (41) and project inward in the radial direction so as to contact end faces (16) of the rollers (13) accommodated in the pockets. Radially outer edges (21a) of the pockets (21) are located radially outside base end parts (44a) of the projecting portions (44).

6 Claims, 9 Drawing Sheets

(30) Foreign Application Priority Data

| Jan. 9, 2015 | (JP) | 2015-003487 |
|---|---|---|
| Jan. 9, 2015 | (JP) | 2015-003505 |
| Jan. 9, 2015 | (JP) | 2015-003508 |
| Jan. 9, 2015 | (JP) | 2015-003512 |

(51) Int. Cl.
  *F16C 19/30* (2006.01)
  *B21D 53/12* (2006.01)
  *F16C 33/66* (2006.01)

(52) U.S. Cl.
  CPC .......... *F16C 33/541* (2013.01); *F16C 33/546* (2013.01); *F16C 33/6681* (2013.01); *F16C 2220/42* (2013.01); *F16C 2240/30* (2013.01); *F16C 2326/01* (2013.01)

(56) References Cited

U.S. PATENT DOCUMENTS

| 3,240,543 | A | 3/1966 | Benson |
| 3,652,141 | A * | 3/1972 | Husten .................... F16C 19/30 384/455 |
| 5,630,670 | A * | 5/1997 | Griffin .................... F16C 19/30 384/606 |
| 6,742,934 | B2 | 6/2004 | Matsuyama et al. |
| 7,837,394 | B2 * | 11/2010 | Takamizawa ....... F16C 33/4635 384/572 |
| 8,480,309 | B2 * | 7/2013 | Ince .................... F16C 33/546 384/575 |
| 8,627,570 | B2 | 1/2014 | Takamizawa |
| 9,593,714 | B1 * | 3/2017 | Ince .................... F16C 33/4676 |
| 9,939,010 | B2 | 4/2018 | Yamamoto et al. |
| 2007/0206894 | A1 * | 9/2007 | Kotani .................... F16C 19/30 384/623 |
| 2008/0019627 | A1 | 1/2008 | Takamizawa et al. |
| 2011/0229067 | A1 * | 9/2011 | Brown .................... F16C 19/26 384/572 |
| 2013/0089286 | A1 | 4/2013 | Fugel et al. |
| 2016/0333936 | A1 | 11/2016 | Kono et al. |

FOREIGN PATENT DOCUMENTS

| DE | 10 2010 005059 | 7/2011 |
| JP | 08-200377 | 8/1996 |
| JP | 3037788 | 5/1997 |
| JP | 09-324817 | 12/1997 |
| JP | 10-220482 | 8/1998 |
| JP | 11-123458 | 5/1999 |
| JP | 2002-250347 | 9/2002 |
| JP | 2004-176781 | 6/2004 |
| JP | 2006-057742 | 3/2006 |
| JP | 2006-250327 | 9/2006 |
| JP | 2006250316 | 9/2006 |
| JP | 2008-0025303 | 1/2008 |
| JP | 2009-047239 | 3/2009 |
| JP | 2009-174637 | 8/2009 |
| JP | 2009-191981 | 8/2009 |
| JP | 2009-275794 | 11/2009 |
| JP | 2011-106637 | 6/2011 |
| JP | 2011-144866 | 7/2011 |
| JP | 2014-095458 | 5/2014 |
| JP | 2015-055274 | 3/2015 |
| WO | 2009/086965 | 7/2009 |

* cited by examiner

THRUST ROLLER BEARING CAGE AND METHOD FOR MANUFACTURING THE SAME

TECHNICAL FIELD

The present invention relates to thrust roller bearing cages (hereinafter sometimes simply referred to as the "cages") and methods for manufacturing the same, and more particularly relates to a thrust roller bearing cage that is manufactured by using a press and a method for manufacturing the same.

BACKGROUND ART

For example, thrust roller bearings that support thrust loads are sometimes placed at such locations in automatic transmissions for automobiles, car air conditioner compressors, etc. that are subjected to thrust loads. For improved fuel efficiency and power saving, it is desired to reduce running torque of such thrust roller bearings. A thrust roller bearing includes bearing rings arranged in the direction of the rotation axis of the thrust roller bearing, a plurality of needle rollers that roll on raceway surfaces of the bearing rings, and a cage that retains the plurality of needle rollers. Some cages are manufactured by bending a steel sheet and then punching out pockets that accommodate the rollers.

A technique relating to the cages included in such thrust roller bearings is disclosed in, e.g., Japanese Unexamined Patent Publication No. H10-220482 (Patent Literature 1). The thrust roller bearing cage of Patent Literature 1 includes an annular body formed by cutting, punching, etc. and projecting portions formed in a radially outer part of the annular body. The projecting portions are formed such that those parts of the radially outer end face of the folded part of the annular body which are located at the positions of the pockets project inward in the radial direction, and the tip ends of the projecting portions face approximately the centers of the end faces of the rollers. That is, the projecting portions of Patent Literature 1 face the inside of the pockets beyond the radially outer end faces of the pockets. Patent Literature 1 discloses that this thrust roller bearing cage reduces running torque of the rollers as the tip ends of the projecting portions contact the rollers at positions near the rotation centers of the rollers.

CITATION LIST

Patent Literatures

Patent Literature 1: Japanese Unexamined Patent Application Publication No. H10-220482

SUMMARY OF INVENTION

Technical Problem

However, lubricant may not flow satisfactorily in the thrust roller bearing of Patent Literature 1.

It is therefore an object of the present invention to provide a thrust roller bearing cage that allows a satisfactory flow of lubricant and a method for manufacturing the same.

Solution to Problem

The inventors found that the problem of an unsatisfactory flow of lubricant in the thrust roller bearing of Patent Literature 1 is significant in areas where the projecting portions contact the rollers. The inventors completed the present invention through their intensive research regarding how to achieve a satisfactory flow of lubricant without in the areas where the projecting portions contact the rollers.

A thrust roller bearing cage according to the present invention is a thrust roller bearing cage included in a thrust roller bearing and including a plurality of pockets accommodating rollers. The thrust roller bearing cage includes: a radially outer area bent portion formed by bending an area located radially outside the pockets inward in a radial direction; and projecting portions that are formed in a tip end of the radially outer area bent portion and project inward in the radial direction so as to contact end faces of the rollers accommodated in the pockets. Radially outer edges of the pockets are located radially outside base end parts of the projecting portions.

A method for manufacturing a thrust roller bearing cage according to the present invention is a method for manufacturing a thrust roller bearing cage included in a thrust roller bearing and including a plurality of pockets accommodating rollers. The method includes the steps of: preparing a cage material that will later become the cage; forming an outer shape of the cage material so that the outer shape has portions that will later become projecting portions projecting inward in a radial direction so as to contact end faces of the rollers accommodated in the pockets; forming the pockets in the cage material so that radially outer edges of the pockets are located radially outside base end parts of the projecting portions; and forming a radially outer area bent portion by bending an area of the cage material which is located radially outside the pockets inward in the radial direction.

According to the thrust roller bearing cage of the present invention and the method for manufacturing the same, the radially outer edges of the pockets are located radially outside the base end parts of the projecting portions. Clearance between the radially outer edge of each pocket and the base end part of each projecting portion can therefore serve as a lubricant flow path. This ensures that a sufficient lubricant flow path is present in the pockets with the projecting portions being in contact with the end faces of the rollers, whereby a satisfactory lubricant flow can be achieved. The thrust roller bearing cage of the present invention and the method for manufacturing the same can thus achieve a satisfactory flow of lubricant.

In the thrust roller bearing cage according to the present invention, it is preferable that areas of the projecting portions which are to contact the end faces of the rollers be subjected to a press-flattening process.

It is preferable that the method for manufacturing the thrust roller bearing cage according to the present invention further include the step of press-flattening areas of the projecting portions which are to contact the end faces of the rollers.

Since the areas of the projecting portions which are to contact the end faces of the rollers are subjected to the press-flattening process, this can reduce the risk that discontinuity of a lubricant film will be caused during rotation of the bearing by the sliding motion of the end faces of the rollers on the areas of the projecting portions which contact the end faces of the rollers. This improves lubricating properties in the contact areas and reduces what is called aggression of the rollers against the projecting portions of the cage. Such a thrust roller bearing cage can thus further reduce the running torque of the bearing.

As used herein, the "press-flattening process" means a process in which, in the step of forming the radially outer area bent portion, the projecting portions are pressed outward in the radial direction by using a radially outer surface of a die that serves as a stopper to control the amount of collapse, in order to smooth the rough surfaces of the projecting portions before and after the process. Specifically, the press-flattening process can smooth a press-sheared surface or a fracture surface, which is formed in the step of forming the outer shape, to arithmetic mean roughness Ra (JIS B 0601) of about 2 μm or less.

In the thrust roller bearing cage according to the present invention, it is preferable that the projecting portions be formed by bending a radially outer area of the cage obliquely inward in the radial direction.

In the method for manufacturing the thrust roller bearing cage according to the present invention, it is preferable that, in the step of forming the radially outer area bent portion, the area of the cage material which is located radially outside the pockets be bent obliquely inward in the radial direction.

The radially outer area bent portion is formed by bending the area located radially outside the pockets obliquely inward in the radial direction. Accordingly, the projecting portions formed in the tip end of the radially outer area bent portion have a smaller contact area with the rollers than in the case where the area located radially outside the pockets is not tilted (the tilt angle is 0°) as in Patent Literature 1. When the rollers are biased from the central axis of the cage toward the outside in the radial direction by a rotational centrifugal force of the rollers, friction is generated between each roller and the part of each projecting portion which contacts the roller. However, since the projecting portions have a smaller contact area with the rollers, rotational resistance can be reduced. Running torque can therefore be reduced.

Advantageous Effects of Invention

The thrust roller bearing cage of the present invention and the method for manufacturing the same allow a satisfactory flow of lubricant.

DESCRIPTION OF EMBODIMENTS

Figure 1:
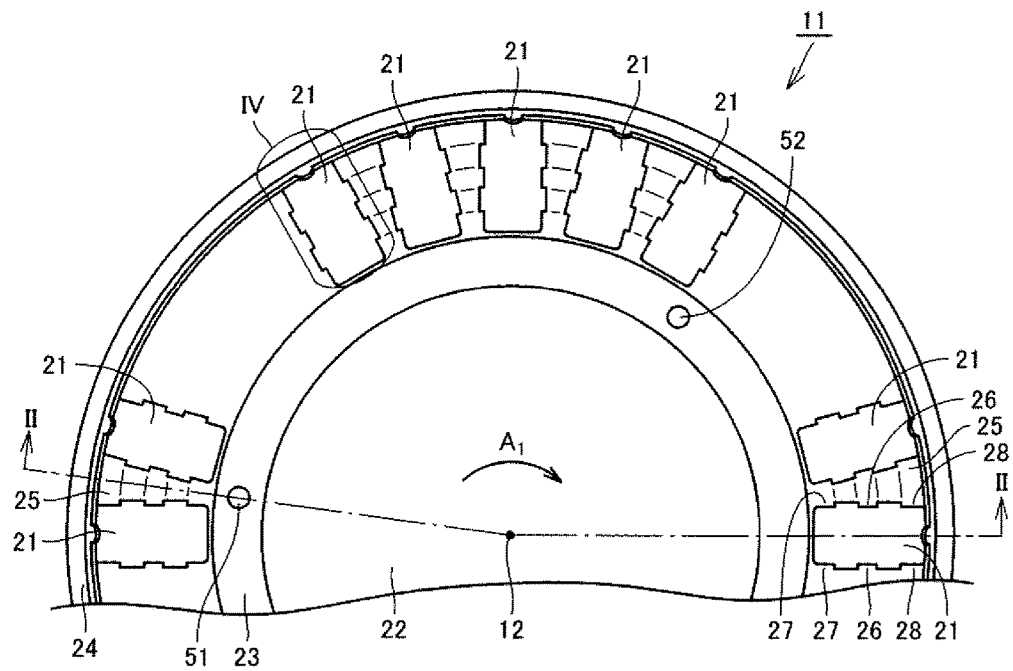
FIG. 1 shows a part of a thrust roller bearing cage according to an embodiment of the present invention.

Embodiments of the present invention will be described below with reference to the drawings. In the figures described below, the same or corresponding portions are denoted with the same reference characters, and description thereof will not be repeated.

Figure 2:
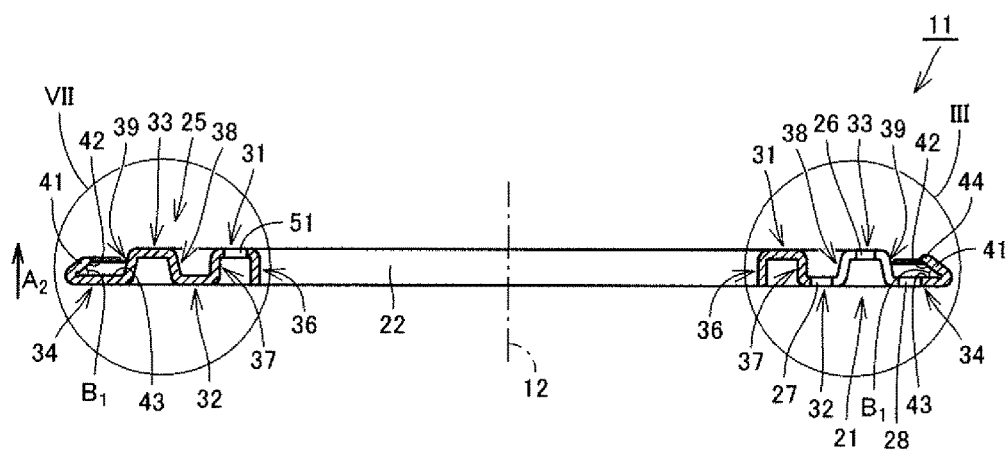
FIG. 2 is a sectional view of the thrust roller bearing cage shown in FIG. 1.
Figure 3:
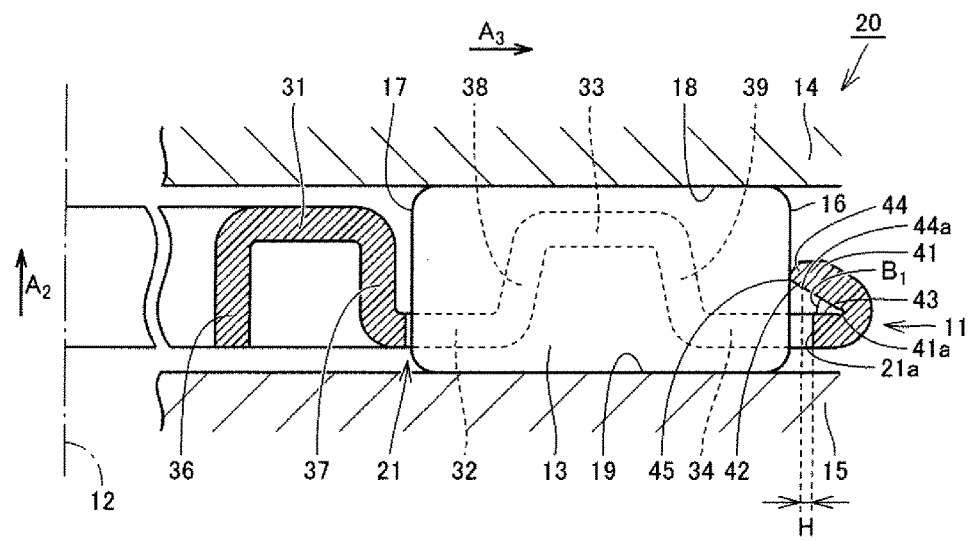
FIG. 3 is an enlarged sectional view showing a part of the thrust roller bearing cage shown in FIG. 2.
Figure 4:
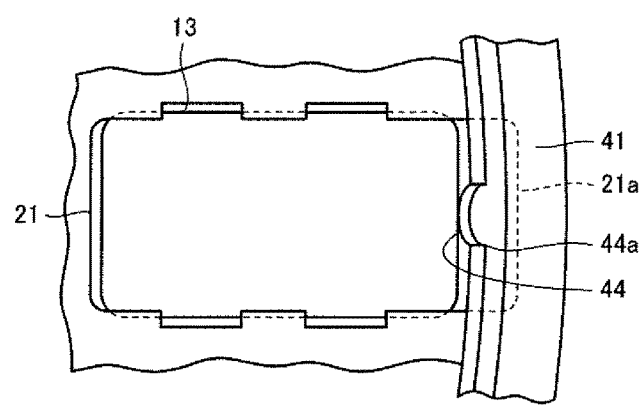
FIG. 4 is an enlarged plan view showing a part of the thrust roller bearing cage shown in FIG. 2.

FIG. 1 shows a part of a thrust roller bearing cage 11 according to an embodiment of the present invention. FIG. 1 shows the cage 11 as viewed in the direction of the rotation axis of the cage 11. FIG. 2 is a sectional view of the thrust roller bearing cage 11 shown in FIG. 1. FIG. 2 shows the cage 11 taken along line II-II in FIG. 1. Specifically, a portion having a pocket, which will be described later, is shown in section on the right side of FIG. 2, and a portion having a pillar, which will be described later, is shown in section on the left side of FIG. 2. FIG. 3 is an enlarged sectional view showing a part of the thrust roller bearing cage 11 shown in FIG. 2. The enlarged sectional view in FIG. 3 shows the area indicated by III in FIG. 2. In FIGS. 2 and 3, the rotation axis 12 of the cage 11 is shown by an alternate long and short dash line. For ease of understanding, FIG. 3 shows a needle roller 13 accommodated in a pocket 21 that will be described later, and a part of a pair of bearing rings 14, 15 disposed on both sides of the cage 11 in the direction of the rotation axis of the cage 11. FIG. 4 is an enlarged plan view showing a part of the thrust roller bearing cage 11 shown in FIGS. 1 and 2. The enlarged plan view in FIG. 4 shows the area indicated by IV in FIG. 1. For ease of understanding, FIG. 4 shows a needle roller 13 accommodated in a pocket 21 that will be described later. The direction perpendicular to the plane of paper of FIGS. 1 and 4 and the vertical direction in FIGS. 2 and 3 are the direction of the rotation axis of the cage 11. The direction shown by arrow $A_1$ or its opposite direction in FIG. 1 is the circumferential direction. For ease of understanding, the upper side in FIGS. 2 and 3 is defined as the upper side in the axial direction. That is, the direction shown by arrow $A_2$ in FIGS. 2 and 3 is the upward direction. The lateral direction in FIGS. 2 and 3 is the radial direction. The direction shown by arrow $A_3$ in FIG. 3 is the radially outward direction.

First, the configuration of the thrust roller bearing cage 11 according to the embodiment of the present invention will be described with reference to FIGS. 1 to 4. The thrust roller bearing cage 11 according to the embodiment of the invention is in the shape of a disc and has a through bore 22 extending straight through its central area in the thickness direction of the cage 11. A rotary shaft, not shown, is inserted through the through bore 22.

The cage 11 includes a pair of annular portions 23, 24 with different diameters, and a plurality of pillars 25 formed at intervals in the circumferential direction so as to form the pockets 21 that accommodate the needle rollers 13 therein and connecting the pair of annular portions 23, 24.

The pockets 21 are substantially rectangular as viewed in the axial direction. The pockets 21 are arranged radially about the rotation axis 12 of the cage 11. The pockets 21 have upper roller stoppers 26 and lower roller stoppers 27, 28 on their side wall surfaces. The upper roller stoppers 26 prevent the needle rollers 13 accommodated in the pockets 21 from falling out upward in the axial direction, while the lower roller stoppers 27, 28 prevent the needle rollers 13 accommodated in the pockets 21 from falling out downward in the axial direction. The upper roller stoppers 26 are formed in the middle parts in the radial direction of the pockets 21. The lower roller stoppers 27 are formed in the radially inner parts of the pockets 21, and the lower roller stoppers 28 are formed in the radially outer parts of the pockets 21. The upper roller stoppers 26 and the lower roller stoppers 27, 28 are formed on the side wall surfaces located on both sides in the circumferential direction of each pocket 21 so as to project into the pockets 21.

The needle rollers 13 are pressed into the pockets 21 to fit in the pockets 21. End faces of each needle roller 13, specifically, an outer end face 16 in the bearing and an inner end face 17 in the bearing, are flat.

The cage 11 has concave and convex portions that are formed by bending a plate in the thickness direction thereof a few times. Specifically, the cage 11 includes four disc portions 31, 32, 33, 34 extending in the radial direction and four cylindrical portions 36, 37, 38, 39 extending in the axial direction. The four disc portions 31 to 34 are arranged in this order from the inside in the radial direction so that the first disc portion 31 has the smallest inside diameter, followed by the second disc portion 32, the third disc portion 33, and the fourth disc portion 34 in ascending order. The four cylindrical portions 36 to 39 are arranged in order of the first cylindrical portion 36, the second cylindrical portion 37, the third cylindrical portion 38, and the fourth cylindrical portion 39 from the inside in the radial direction. The first cylindrical portion 36 and the second cylindrical portion 37 extend straight in the axial direction. The third cylindrical portion 38 is slightly tilted so that its radially inner part is located below its radially outer part in the axial direction. The fourth cylindrical portion 39, which is the outermost cylindrical portion in the radial direction, is slightly tilted so that its radially inner part is located above its radially outer part in the axial direction.

More specifically, the first cylindrical portion 36 extends in the axial direction. The first disc portion 31 is formed so as to be continuous with the upper edge of the first cylindrical portion 36 and to extend in the radially outward direction. The second cylindrical portion 37 is formed so as to be continuous with the radially outer edge of the first disc portion 31 and to extend downward in the axial direction. The second disc portion 32 is formed so as to be continuous with the lower edge of the second cylindrical portion 37 and to extend in the radially outward direction. The third cylindrical portion 38 is formed so as to be continuous with the radially outer edge of the second disc portion 32 and to extend upward in the axial direction. The third disc portion 33 is formed so as to be continuous with the upper edge of the third cylindrical portion 38 and to extend in the radially outward direction. The fourth cylindrical portion 39 is formed so as to be continuous with the radially outer edge of the third cylindrical portion 33 and to extend downward in the axial direction. The fourth disc portion 34 is formed so as to be continuous with the lower edge of the fourth cylindrical portion 39 and to extend in the radially outward direction. The first disc portion 31 is substantially flush with the third disc portion 33. The second disc portion 32 is substantially flush with the fourth disc portion 35.

The upper roller stoppers 26 are formed in the third disc portion 33. The lower roller stoppers 27 are formed in the second disc portion 32, and the lower roller stoppers 28 are formed in the fourth disc portion 34.

The inner annular portion 23 in the radial direction includes the first disc portion 31, a part of the second disc portion 32, the first cylindrical portion 36, and the second cylindrical portion 37. The outer annular portion 24 in the radial direction includes a part of the fourth disc portion 34, a radially outer area bent portion 41, and projecting portions 44. The radially outer area bent portion 41 and the projecting portions 44 will be described later. Each pillar 25 includes a part of the second disc portion 32, the third disc portion 33, a part of the fourth disc portion 34, the third cylindrical portion 38, and the fourth cylindrical portion 39.

The cage 11 includes the radially outer area bent portion 41 that is formed by bending a radially outer area of the cage 11 inward in the radial direction. In other words, the cage 11 has the radially outer area bent portion 41 that is formed by bending an area located radially outside the pockets 21 inward in the radial direction. The radially outer area bent portion 41 is a standing wall standing in the axial direction and is formed to extend continuously in an annular shape.

The radially outer area bent portion 41 of the present embodiment is formed by bending the area located radially outside the pockets 21 obliquely inward in the radial direction. Specifically, the radially outer area bent portion 41 is formed by bending the radially outer edge of the fourth disc portion 34, which is the outermost disc portion in the radial direction, upward in the axial direction to a predetermined angle.

The angle of the radially outer area bent portion 41, namely the angle between a radially inner surface 42 of the radially outer area bent portion 41 and an upper surface 43 of the fourth disc portion 34, is shown by an angle $B_1$ in FIGS. 2 and 3. This angle may be 0°, but is preferably an acute angle.

As shown in FIG. 3, a bottom part 41a of the radially outer area bent portion 41 is located radially outside a radially outer edge 21a of each pocket 21. The bottom part 41a of the radially outer area bent portion 41 is the position along which the radially outer area of the cage 11 is bent. In this case, since the radially outer area bent portion 41 and the fourth disc portion 34 form a lubricant reservoir, lubricant can be stably supplied to the contact portions between the projecting portions 44 described later and the end faces 16 of the rollers 13, whereby wear resistance of the cage can be improved. Moreover, strength of the radially outer area bent portion 41 can be improved.

The bottom part 41a of the radially outer area bent portion 41 may be located at the same position in the radial direction as the radially outer edges 21a of the pockets 21. In this case, since a large lubricant flow path can be formed, a more satisfactory flow of lubricant can be achieved.

The radially outer area bent portion 41 has the projecting portions 44 formed in its tip end. The projecting portions 44 project inward in the radial direction into radially outer areas of the pockets 21 so as to contact the end faces 16 of the needle rollers 13 accommodated in the pockets 21. That is, the projecting portions 44 abut on the end faces of the rollers accommodated in the pockets 21 to restrict movement of the rollers toward the outside in the radial direction. Specifically, the projecting portions 44 are shaped to extend continuously from the inner peripheral edge of the radially outer area bent portion 41 toward the inside in the radial direction. That is, the radially outer area bent portion 41 and the projecting portions 44 are formed as a single-piece member.

The projecting portions 44 are formed at circumferential positions so that the tips of the projecting portions 44 are located in the middle parts in the circumferential direction of the pockets 21. Specifically, the projecting portions 44 are formed so that their corners 45 on the surface 42 side, namely the innermost parts in the radial direction of the projecting portions 44 (the innermost corners 45 in the radial direction of the projecting portions 44), contact the centers of the end faces 16 of the needle rollers 13 accommodated in the pockets 21. In this example, the corners 45 are the corners of the projecting portions 44 which are located closer to the fourth disc portion 34.

The corners 45 have been press-flattened. The corners 45 subjected to the press-flattening process have no sharply pointed parts and smoothly connect to the surfaces forming the corners 45. This reduces aggression of the corners 45 against members that are contacted by the corners 45.

As shown in FIGS. 3 and 4, a radially outer base end part 44a of each projecting portion 44 is located radially inside the radially outer edge 21a of each pocket 21. The base end part 44a of each projecting portion 44 is the boundary with the radially outer area bent portion 41. In other words, the radially outer edges 21a of the pockets 21 are located radially outside the radially outer edges of the projecting portions 44. That is, the radially outer areas of the pockets 21 overlap the entire projecting portions 44 and a radially inner area of the radially outer region bent portion 41. As shown in FIG. 3, clearance between the radially outer end face 16 of each roller 13 and the radially outer edge 21a of each pocket 21 serves as a lubricant flow path, and the radially outer edge 21a of each pocket 21 extends to a position located radially outside the base end part 44a of each projecting portion 44. A lubricant flow path is thus widened by an amount corresponding to clearance H shown in FIG. 3.

As shown in FIGS. 1 and 2, the cage 11 has three pilot holes 51, 52. The three pilot holes 51, 52 serve as engagement portions for alignment. One of the pilot holes is not shown in FIG. 1. The three pilot holes 51, 52 are formed at intervals in the circumferential direction and extend straight through the cage 11 in the thickness direction of the cage 11. The three pilot holes 51, 52 open in a circular shape. The three pilot holes 51, 52 are formed substantially equally spaced apart from each other. In this example, the three pilot holes 51, 52 are formed at intervals of 120 degrees about the rotation axis 12 of the cage 11. Specifically, the pilot holes 51, 52 are formed in the middle part in the radial direction of the innermost first disc portion 31 in the radial direction. For example, the diameter of the pilot holes 51, 52 is φ2.5 mm or φ3 mm.

For example, a thrust roller bearing 20 having such a cage 11 includes the plurality of needle rollers 13, the upper bearing ring 14, and the lower bearing ring 15. When the thrust roller bearing 20 is in operation, the needle rollers 13 accommodated in the pockets 21 roll on a raceway surface 18 of the upper bearing ring 14 in the axial direction and a raceway surface 19 of the lower bearing ring 15 in the axial direction. The cage 11 rotates around its rotation axis 12. Each of the needle rollers 13 accommodated in the pockets 21 revolves while rotating around its axis. The needle rollers 13 are subjected to a radially outward centrifugal force. The centers of the end faces 16 of the needle rollers 13 make sliding contact with the projecting portions 44 of the cage 11, specifically the innermost corners 45 in the radial direction of the projecting portions 44 of the cage 11. That is, the corners 45 of the projecting portions 44 are the areas that contact the end faces 16 of the needle rollers 13.

Figure 5:
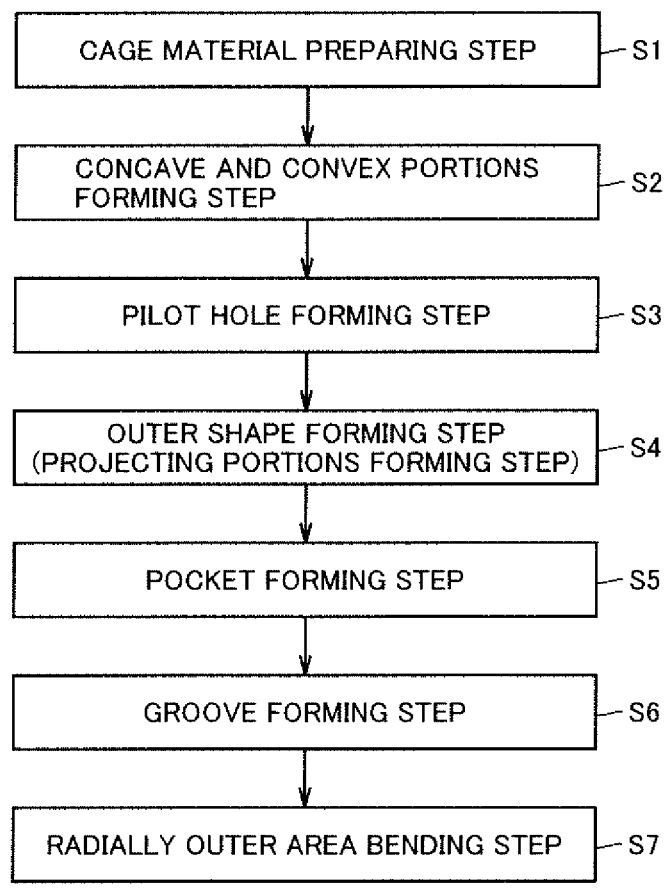
FIG. 5 is a flowchart illustrating representative steps of a method for manufacturing the thrust roller bearing cage according to the embodiment of the present invention.

Next, a method for manufacturing the thrust roller bearing cage 11 according to the embodiment of the present invention will be described. The thrust roller bearing cage 11 is manufactured by using a transfer press. The transfer press is a relatively inexpensive press machine with a less complicated configuration. FIG. 5 is a flowchart illustrating representative steps of the method for manufacturing the thrust roller bearing cage 11 according to the embodiment of the present invention.

Referring to FIG. 5, a cage material, which will later become the cage 11, is first prepared (cage material preparing step: step S1). For example, the cage material is a thin flat steel sheet. At this stage, the cage material may be either a plate cut into a substantially rectangular shape or a circular plate, as the final outer shape of the cage is formed in an outer shape forming step (step S4) that will be performed later.

Next, concave and convex portions are formed in the cage material in the thickness direction of the cage material (concave and convex portions forming step: step S2). This ensures that the cage 11 has a large length dimension in the direction of its rotation axis even if the cage 11 is in the shape of a thin plate, whereby the cage 11 can appropriately retain the rollers.

Figure 6:
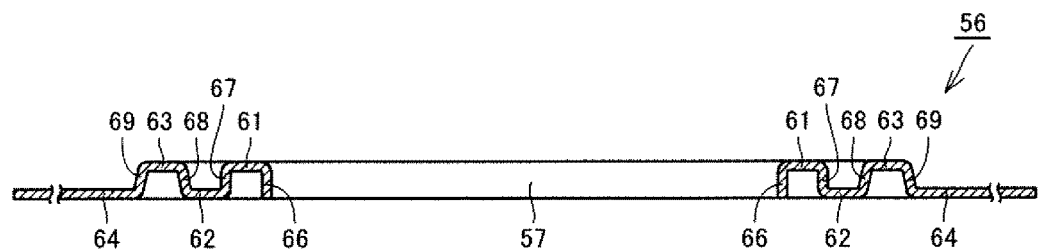
FIG. 6 is a sectional view of a cage material after a concave and convex portions forming step.

Specifically, in this step, the cage material is subjected to a drawing process. In this case, the concave and convex portions can be formed more efficiently. FIG. 6 is a sectional view of the cage material after the concave and convex portions forming step. The section shown in FIG. 6 corresponds to the section shown in FIG. 2. Specifically, referring to FIG. 6, a flat plate-like cage material 56 is subjected to a drawing process to form first to fourth disc portions 61 to 64 and first to fourth cylindrical portions 66 to 69. A circular through bore 57 is formed in the central part of the cage material 56 so as to extend therethrough in the thickness direction. That is, in this case, the cage material 56 has what is called a mountain-and-valley shape made by bending the cage material 56 a plurality of times in the axial direction.

Figure 7:
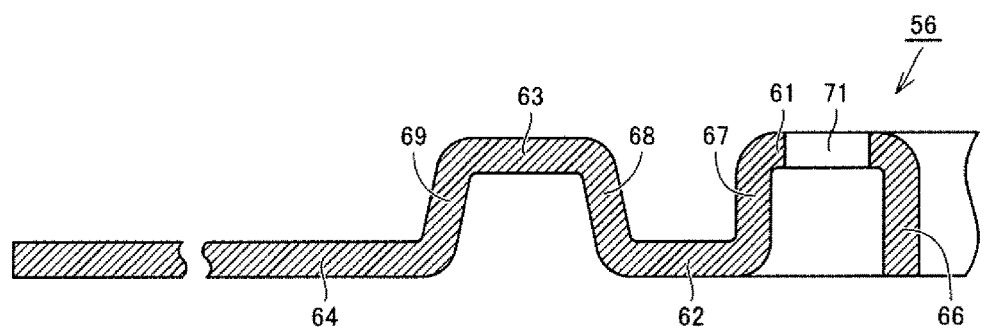
FIG. 7 is an enlarged sectional view showing a part of the cage material after a pilot hole forming step.

Thereafter, pilot holes that will serve as engagement portions are formed (pilot hole forming step: step S3). FIG. 7 is an enlarged sectional view showing a part of the cage material 56 after the pilot hole forming step. The section shown in FIG. 7 corresponds to the area VII in FIG. 2. A pilot hole 71 that will serve as an engagement portion is formed in the middle part in the radial direction of the first disc portion 61 so as to extend straight through the first disc portion 61 in the thickness direction. Three of the pilot holes 71 are formed in total at intervals of 120 degrees in the circumferential direction so as to be substantially equally spaced apart from each other.

Subsequently, the outer shape of the cage material 56 is formed (outer shape forming step: step S4). In this step, the outer shape of the cage material 56 is formed so that the outer shape has portions that will later become projecting portions projecting inward in the radial direction so as to contact the end faces of the rollers accommodated in pockets to be formed in a pocket forming step (step S5). The pocket forming step will be described later.

Figure 8:
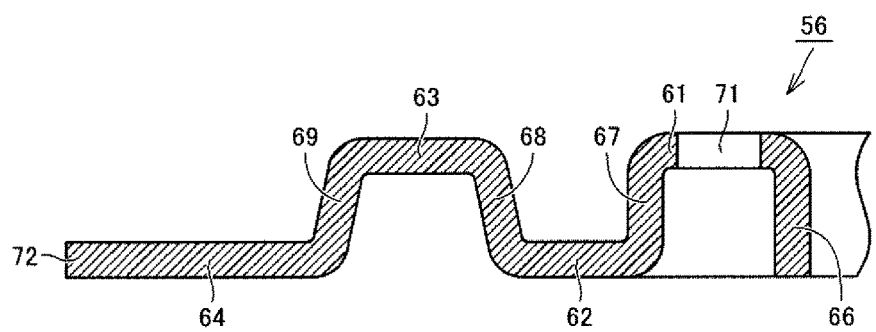
FIG. 8 is an enlarged sectional view showing a part of the cage material after an outer shape forming step.

FIG. 8 is an enlarged sectional view showing a part of the cage material 56 after the outer shape forming step. The section shown in FIG. 8 corresponds to the area VII shown in FIG. 2, and is a section taken along line VIII-VIII in FIG. 9. Specifically, the cage material 56 is punched straight in the thickness direction so that the cage 11 can be formed into the final outer shape by a radially outer area bending step (step S7) etc. that will be performed later. In this case, the outer shape of the cage material 56 can be formed relatively easily and accurately. A radially outer edge 72 of the cage 11, specifically, a radially outer edge 72 of the fourth disc portion 64, is thus formed.

Figure 9:
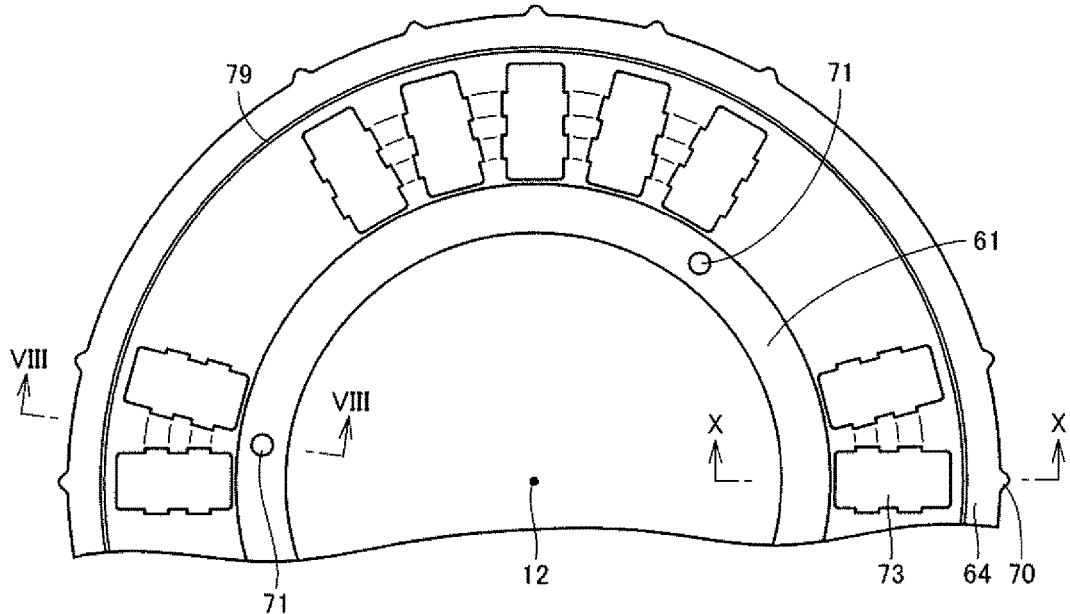
FIG. 9 shows a part of the cage material after a pocket forming step.

When forming the outer shape, the cage material 56 is punched so as to form the portions that will later become projecting portions 70. That is, in this case, the outer shape forming step is also a projecting portions forming step, i.e., the step of forming the projecting portions. FIG. 9 shows a part of the cage material 56 after the pocket forming step, which is the step following the outer shape forming step. FIG. 9 corresponds to FIG. 1. When punching the cage material 56 so as to form the projecting portions 70, the cage material 56 is aligned in the circumferential direction by using the plurality of pilot holes 71. Specifically, a plurality of guide pins (not shown), which serve as what is called pencil-like alignment jigs having a pointed end and having a tapered shape with its diameter gradually increasing from the pointed end, are prepared and are gradually inserted into the plurality of pilot holes 71 from one side in the thickness direction. The cage material 56 is thus aligned by using the plurality of guide pins and is punched into the overall outer shape with a punching machine (not shown) in view of the positions, shape, etc. of the projecting portions 70. Accordingly, even if the cage material 56 is slightly out of alignment with the punching machine with respect to the proper positions where the projecting portions 70 are supposed to be formed, the cage material 56 can be aligned with the punching machine with respect to the proper positions where the projecting portions 70 are supposed to be formed, as the pencil-like guide pins having a pointed end are gradually inserted into the pilot holes 71. The punching process can thus be performed. In this example, since the cage material 56 has the three pilot holes 71, rotation etc. of the cage material 56 is prevented during alignment. The cage material 56 can thus be aligned more accurately.

Subsequently, pockets are formed (pocket forming step: step S5). In this step, the pockets are formed so that the radially outer edges of the pockets will be located radially outside the base end parts of the projecting portions with the tip (the opposite side from the bottom part) of a radially outer area bent portion (step S7), described later, facing inward in the radial direction. In the present embodiment, the pockets are formed so that the radially outer edges of the pockets are located radially inside the bottom part of the radially outer area bent portion that will be formed in the radially outer area bending step (step S7) described later.

Figure 10:
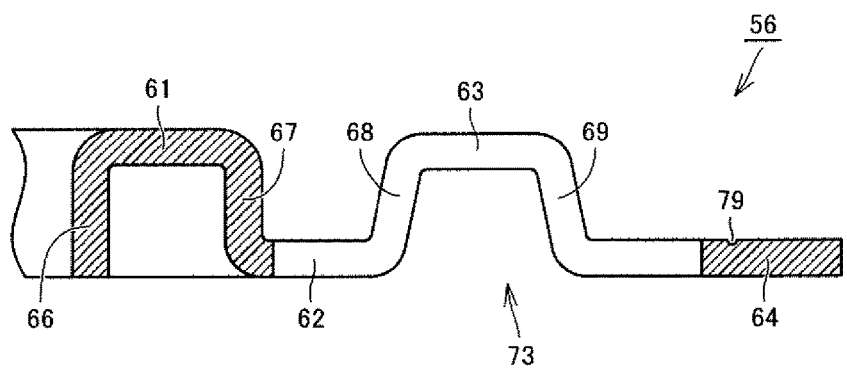
FIG. 10 is an enlarged sectional view showing a part of the cage material after the pocket forming step.

FIG. 10 is an enlarged sectional view showing a part of the cage material after the pocket forming step. The section shown in FIG. 10 corresponds to the area III shown in FIG. 2 and is a section taken along line X-X in FIG. 9. In this example, each pocket 73 is punched out along a part of the second disc portion 62, the third disc portion 63, and a part of the fourth disc portion 64 and also along the third cylindrical portion 68 and the fourth cylindrical portion 69 so as to extend straight through the cage material 56 in the thickness direction. Although not shown in FIG. 10, the upper roller stoppers and the lower roller stoppers, which are shaped so as to project into the pockets 73 in the circumferential direction, are formed simultaneously with the pockets 73. That is, the pockets 73 are punched out in view of the shape of the upper roller stoppers and the lower roller stoppers so as to conform to the outer shape of needle rollers 13 that are to be accommodated in the pockets 73. The plurality of pockets 73 may be punched out either all at once or one by one.

When forming the pockets 73 in the cage material 56, the pilot holes 71 are also used to align the cage material 56 to be punched with a punching machine (not shown) for punching out the pockets. That is, the pockets 73 are formed with respect to the positions of the pilot holes 71. As in the case of the outer shape forming step, alignment in the circumferential direction is performed by using the plurality of pilot holes 71. Specifically, a plurality of guide pins serving as sharp pencil-like alignment jigs are prepared and the tip ends of the guide pins are gradually inserted into the plurality of pilot holes 71 from one side in the thickness direction as described above. The cage material 56 is thus aligned by using the plurality of guide pins, and the pockets 73 are punched out with the punching machine in view of the positions, shape, etc. of the pockets 73. The pockets 73 are thus formed in phase with the projecting portions 70 in the circumferential direction, so that an appropriate positional relationship can be established between the pockets 73 and the projecting portions 70. Accordingly, the projecting portions 70 can be accurately and efficiently formed in terms of the positional relationship of the projecting portions 70 with the pockets 73. Since the projecting portions 44 are accurately formed at the appropriate positions, end faces 16 of the needle rollers 13 can appropriately contact the projecting portions 44 when the bearing is in operation. The plurality of pockets 73 may be punched out either all at once or one by one.

In the present embodiment, the pilot holes 71 are formed in an area located radially inside the pockets 73. In this case, the pilot holes 71 can be formed by making effective use of the available area of the cage 11.

In the present embodiment, the pilot holes 71 are formed so as not to overlap the pockets 73 in the circumferential direction. This can avoid local strength reduction in the circumferential direction of the cage 11. The positional relationship of the pockets 73 with the pilot holes 71 can be determined as desired. Specifically, in this example, the plurality of pockets 73 are formed so that each of the pilot holes 71 is located at a position corresponding to the middle in the circumferential direction between adjoining ones of the pockets 73.

Subsequently, as shown in FIGS. 9 and 10, an annular groove 79 is formed at a position radially outside the pockets 73 in the cage material (groove forming step: step S6). In this step (step S6), the groove 79 is formed at such a position that the cage material is to be bent along the groove 79 when forming a radially outer area bent portion 41 in the radially outer area bending step (step S7) described below. Although performing the groove forming step (step S6) makes it easier to bend a radially outer area of the cage material 56 inward in the radially outer area bending step (step S7) described below, the groove forming step (step S6) may be omitted. The steps S4 to S6 may be performed in any order.

Subsequently, an area of the cage material 56 which is located radially outside the pockets 73 is bent inward in the radial direction to form the radially outer area bent portion (radially outer area bending step) (step S7). In this step, it is preferable that the area of the cage material 56 which is located radially outside the pockets 73 be bent obliquely inward in the radial direction to an acute tilt angle to form the radially outer area bent portion. In the case where the groove forming step (step S6) is performed, the radially outer area of the cage material 56 is bent along the groove 79 to form the radially outer area bent portion.

Figure 11:
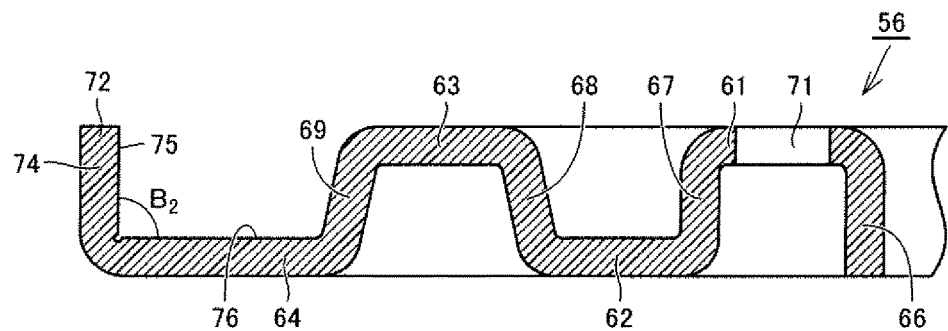
FIG. 11 is an enlarged sectional view showing a part of the cage material during a radially outer area bending step.
Figure 12:
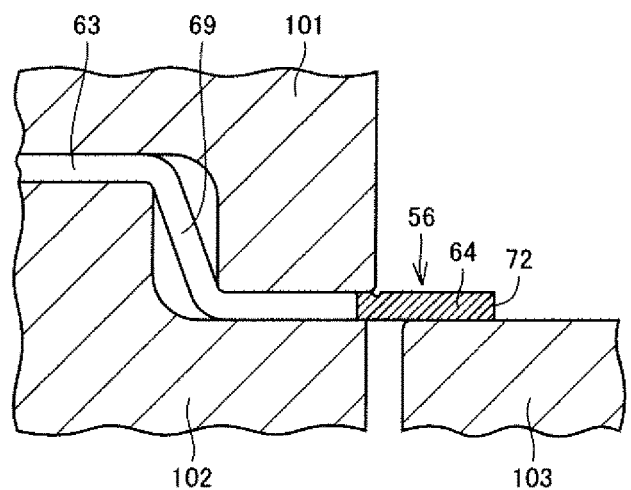
FIG. 12 is an enlarged sectional view illustrating how the radially outer area bending step is performed.
Figure 13:
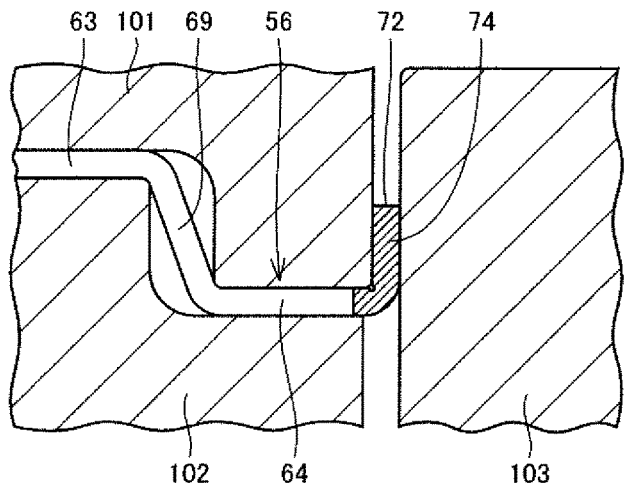
FIG. 13 is an enlarged sectional view illustrating how the radially outer area bending step is performed.
Figure 14:
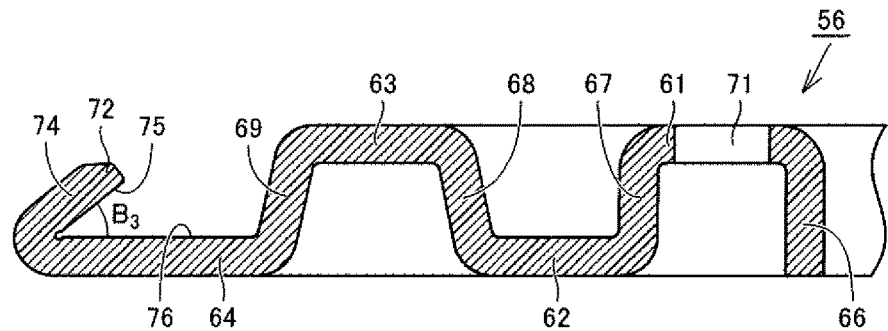
FIG. 14 is an enlarged sectional view showing a part of the cage material after the radially outer area bending step.
Figure 15:
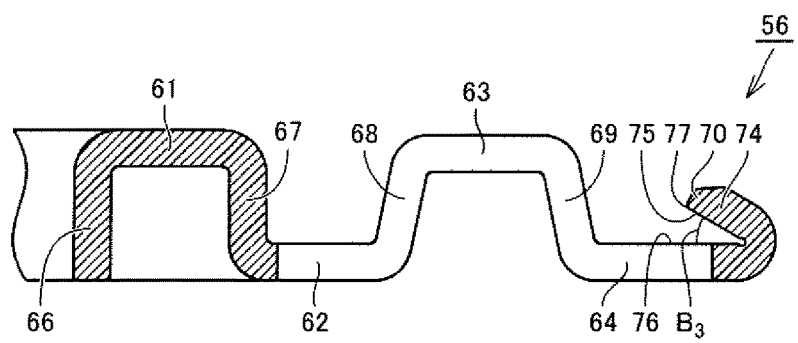
FIG. 15 is an enlarged sectional view showing a part of the cage material after the radially outer area bending step.

FIG. 11 is an enlarged sectional view showing a part of the cage material during the radially outer area bending step. FIGS. 12 and 13 are enlarged sectional views illustrating how the radially outer area bending step is performed. FIGS. 14 and 15 are enlarged sectional views showing a part of the cage material 56 after the radially outer area bending step. The sections shown in FIGS. 11 and 14 correspond to the area VII in FIG. 2. The section shown in FIG. 15 corresponds to the area III in FIG. 2. The sections shown in FIGS. 12 and 13 show the positional relationship of an area of the cage material 56 which is located radially outside the position corresponding to the area III in FIG. 2 with holding members 101, 102 and a pressing member 103. In this example, as shown in FIG. 11, the annular radially outer edge 72 of the cage material 56 is first bent along the entire circumference so as to extend straight in the thickness direction. That is, the angle $B_2$ between a radially inner surface 75 of a radially outer area bent portion 74 and an upper surface 76 of the fourth disc portion 64 is approximately a right angle. For example, the radially outer edge 72 is bent to a right angle by the following method, although the present invention is not particularly limited to this method. As shown in FIG. 12, the entire cage material 56 except for a radially outer area of the fourth disc portion 64 is sandwiched between the holding members 101, 102 in the vertical direction and is held therebetween, and the pressing member 103 is placed under the radially outer area of the fourth disc portion 64. As shown in FIG. 13, the pressing member 103 is then moved upward. The radially outer area bent portion 74 can thus be formed at a right angle with respect to the fourth disc portion 64.

Subsequently, as shown in FIGS. 14 and 15, the radially outer area bent portion 74 is tilted further inward in the radial direction, whereby the radially outer area bent portion 74 is formed. The bending angle (tilt angle), that is, the angle between the radially inner surface 75 of the radially outer area bent portion 74 and the upper surface 76 of the fourth disc portion 64 is shown by an angle $B_3$ in FIGS. 14 and 15. The angle $B_3$ corresponds to the angle $B_1$ described above. In other words, the angle $B_1$ is equal to the angle $B_3$. The angles $B_1$, $B_3$ are preferably an acute angle.

In this example, in terms of the positional relationship in the circumferential direction, the projecting portions 70 are formed at the positions corresponding to the middle parts in the circumferential direction of the pockets 73. The projecting portions 70 are thus formed at appropriate positions. Specifically, the projecting portions 70 abut on the centers of the end faces 16 of the needle rollers 13 at their corners 77 located closer to the fourth disc portion 64. Finally, the areas of the projecting portions 70 which are to contact the end faces 16 of the needle rollers 13 are subjected to a press-flattening process. The thrust roller bearing cage 11 configured as shown in FIGS. 1 to 4 is thus manufactured.

Figure 16:
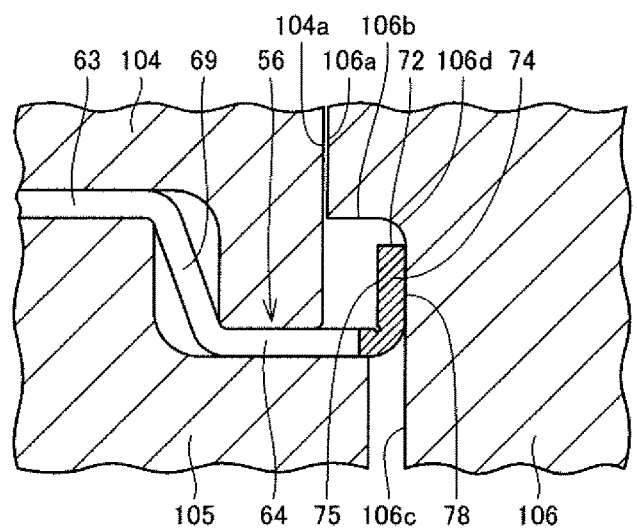
FIG. 16 is an enlarged sectional view illustrating how the radially outer area bending step is performed.
Figure 17:
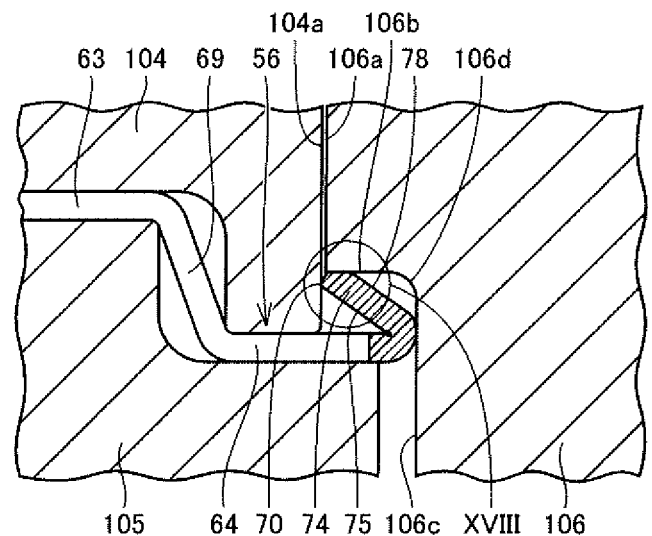
FIG. 17 is an enlarged sectional view illustrating how a press-flattening step is performed.
Figure 18:
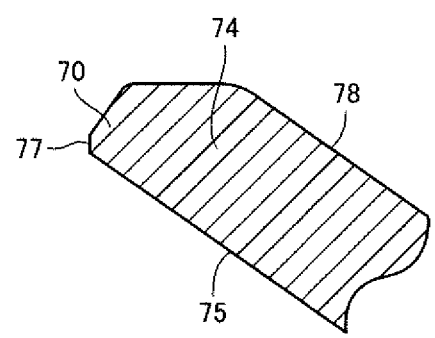
FIG. 18 is an enlarged sectional view showing the tip of a radially outer area bent portion after the press-flattening step.

The step of tilting the radially outer edge 72 of the cage material 56 inward in the radial direction after the annular radially outer edge 72 is bent so as to extend straight in the thickness direction and the press-flattening process may be performed successively. FIG. 16 is an enlarged sectional view illustrating how the radially outer area bending step is performed. FIG. 17 is an enlarged sectional view illustrating how the press-flattening step is performed. FIG. 18 is an enlarged sectional view showing the tip of the radially outer area bent portion after the press-flattening step. Specifically, as shown in FIG. 16, after the cage material 56 is bent so that the radially outer area bent portion 74 extends at a right angle with respect to the fourth disc portion 64, an area of the cage material 56 which is located radially inside the radially outer area bent portion 74 is sandwiched between dies 104, 105 in the vertical direction and is held therebetween. At this time, the radially outer edge of the upper die 104 is located radially inside the radially outer edge of the lower die 105. A die 106 that presses the radially outer area bent portion 74 downward from above is also placed so as to contact a radially outer surface 78 of the radially outer area bent portion 74. The die 106 includes a radially inner end face 106a that faces the upper die 104 and extends in the vertical direction, a horizontal face 106b that is continuous with the radially inner end face 106a and extends outward in the radial direction, and a radially inner face 106c that faces the radially outer surface 78 of the radially outer area bent portion 74 and extends in the vertical direction. A part 106d of the die 106 where the horizontal face 106b and the radially inner face 106c meet has a round (R) shape. When the die 106 is moved downward so that the radially inner end face 106a moves along a radially outer end face 104a of the die 104, the radially outer area bent portion 74 can be tilted inward in the radial direction as guided by the round part 106d. Subsequently, as shown in FIG. 17, the die 104 is moved further downward so that the radially inner corner of the radially outer area bent portion 74 is smoothed by the radially outer end face 104a of the die 104 and the radially outer corner of the radially outer area bent portion 74 is smoothed by the horizontal face 106b of the die 106. As shown in FIG. 18, the projecting portions 70 subjected to the press-flattening process in the areas of the projecting portions 70 which are to contact the end faces of the rollers can be formed in this manner.

As described above, in the thrust roller bearing cage 11 of the present embodiment and the method for manufacturing the same, the radially outer edges 21a of the rollers 21, 73 are located radially outside the base end parts 44a of the projecting portions 44, 70. Since the pockets 21, 73 are extended radially outward from the base end parts 44a of the projecting portions 44, 70, clearance between the radially outer edge 21a of each pocket 21, 73 and the base end part 44a of each projecting portion 44, 70 (clearance H in FIG. 3) can serve as a lubricant flow path. In Patent Literature 1, since the radially outer base end parts of the projecting portions are located at the same position in the radial direction as the radially outer edges of the pockets, the clearance H in FIG. 3 is not provided. In the present embodiment, it is ensured that a sufficient lubricant flow path is present in the pockets 21, 73 with the projecting portions 44, 70 being in contact with the end faces 16 of the rollers 13, whereby a satisfactory lubricant flow can be achieved. Satisfactory circulation of the lubricant can therefore be achieved with a small amount of lubricant (lean lubrication condition), namely without increasing the amount of lubricant. A sufficient amount of lubricant can thus be supplied to the contact areas between the projecting portions 44, 70 and the rollers 13, whereby running torque can be reduced.

Even if those parts of the projecting portions 44 which contact the rollers become worn through the use of the thrust roller bearing cage 11 of the present embodiment, the clearance between the radially outer edge 21a of each pocket 21, 73 and the radially outer end face 16 of each roller 13, which serves as a lubricant flow path, can be maintained as the pockets 21 are extended to a position radially outside the base end parts 44a of the projecting portions 44. Accordingly, even if the radially inner tips (edges on the opposite side from the base end parts 44a) of the projecting portions 44, 70 become worn after long term use of the thrust roller bearing cage 11, a satisfactory lubricant flow is allowed in the lean lubrication condition, whereby reduced running torque can be maintained.

In the thrust roller bearing cage 11 of the present embodiment and the method for manufacturing the same, it is preferable that the bottom part 41a of the radially outer area bent portion 41, 74 be located radially outside the radially outer edges 21a of the pockets 21. In this case, an area where lubricant is stored can be formed in the annular portion 24, namely the outer annular portion in the radial direction, by the radially outer area bent portion 41, 74 and the fourth disc portion 34, 64. A sufficient amount of lubricant can thus be supplied to the contact portions between the projecting portions 44, 70 and the end faces 16 of the rollers 13, whereby wear resistance of the cage 11 can be improved.

Figure 19:
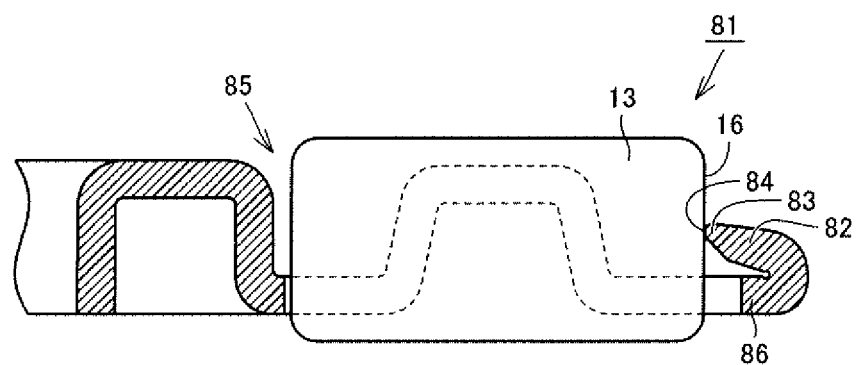
FIG. 19 is a sectional view showing a part of a thrust roller bearing cage according to another embodiment of the present invention.

In the above embodiment, the corners of the projecting portions which are located closer to the fourth disc portion contact the centers of the end faces of the needle rollers accommodated in the pockets. However, the present invention may have the following configuration. FIG. 19 is a sectional view showing a part of a cage having this configuration. FIG. 19 corresponds to the section of the cage shown in FIG. 3.

Referring to FIG. 19, a thrust roller bearing cage 81 according to another embodiment of the present invention has a radially outer area bent portion 82 having projecting portions 83 formed at positions corresponding to the positions of pockets 85. The projecting portions 83 contact the centers of end faces 16 of needle rollers 13 accommodated in the pockets 85 at corners 84 located on the opposite side of the projecting portions 83 from a fourth disc portion 86. The corners 84 have been press-flattened. This configuration can be achieved by machining the corners 84 with a jig angled so as to conform to the corner 84 in the radially outer area bending step.

Figure 20:
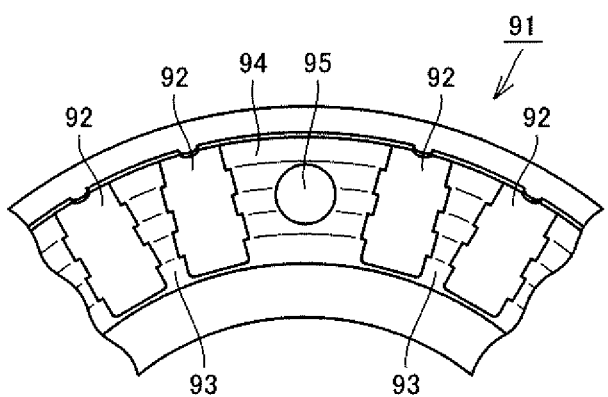
FIG. 20 shows a part of a thrust roller bearing cage according to still another embodiment of the present invention.

A pilot hole may be formed at a position where a pocket is supposed to be formed. In other words, one of the plurality of pockets may be used as a pilot hole. FIG. 20 shows a part of a cage having this configuration. Referring to FIG. 20, a thrust roller bearing cage 91 according to still another embodiment of the present invention includes a plurality of pockets 92 and pillars 93 each located between adjoining two of the pockets 92. A pilot hole 95 is formed at a position where a pocket 92 is supposed to be formed in a pillar 94 located between the pockets 92. In this configuration, one of the plurality of pockets 92 that are formed equally spaced apart from each other in the circumferential direction is replaced with this pilot hole 95.

In the above embodiment, the pilot holes extend straight through the cage in the thickness direction. However, the present invention is not limited to this. For example, the pilot holes extending through the cage may have a tapered wall surface. The pilot holes are not limited to the circular holes and may be quadrilateral holes, triangular holes, etc. The pilot holes are formed as engagement portions. However, the present invention is not limited to this. The engagement portions may have other configurations. For example, the engagement portions may be formed by cutouts.

In the above embodiment, a drawing process is performed in the concave and convex portions forming step. However, the present invention is not limited to this. A process other than the drawing process, such as a bending process, may be used to form concave and convex portions.

In the above embodiment, the cage has the concave and convex portions that are formed in the thickness direction. However, the present invention is not limited to this. The cage may not have the concave and convex portions that are formed in the thickness direction, and a cage in the form of what is called a laminate of two plates may be used.

In the above embodiment, the thrust roller bearing having such a cage as described above may not have bearing rings. Rollers other than the needle rollers, such as long rollers etc., may be used.

The embodiments disclosed herein are by way of example in all respects and should not be interpreted as restrictive. The scope of the present invention is defined by the claims rather than by the above embodiments, and the invention is intended to cover all changes and modifications within the spirit and scope of the invention as defined by the claims.

INDUSTRIAL APPLICABILITY

The thrust roller bearing cage according to the present invention and the method for manufacturing the same are effectively utilized to meet demands for thrust roller bearing cages with excellent performance and more efficient methods for manufacturing such a thrust roller bearing cage.

REFERENCE SIGNS LIST 11, 81, 91 Cage
12 Rotation Axis
13 Roller
14, 15 Bearing Ring
16, 17 End Face
18, 19 Raceway Surface
20 Thrust Roller Bearing
21, 73, 85, 92 Pocket
21a Edge
22, 57 Through Bore
23, 24 Annular Portion
25, 93, 94 Pillar
26, 27, 28 Roller Stopper
31, 32, 33, 34, 61, 62, 63, 64, 86 Disc Portion
36, 37, 38, 39, 66, 67, 68, 69 Cylindrical Portion
41, 74, 82 Radially Outer Area Bent Portion
41a Bottom Part
44a Base End Part
42, 43, 75, 76, 78 Surface
44, 70, 83 Projecting Portion
45, 77, 84 Corner
51, 52, 71, 95 Pilot Hole
56 Cage Material
72 Edge
79 Groove
101, 102 Holding Member
103 Pressing Member
104, 105, 106 Die
104a Radially Outer End Face
106a Radially Inner End Face
106b Horizontal Face
106c Radially Inner Face
106d Part

The invention claimed is:

1. A thrust roller bearing cage included in a thrust roller bearing and including a plurality of pockets accommodating rollers, comprising:

a radially outer area bent portion formed by bending a radially outer edge part of an area located radially outside the pockets obliquely inward in a radial direction, the radially outer area bent portion formed to extend continuously in an annular shape; and projecting portions that are formed in a tip end of the radially outer area bent portion and project inward in the radial direction from an inner peripheral edge of the radially outer area bent portions so as to contact end faces of the rollers accommodated in the pockets, wherein radially outer edges of the pockets are located radially outside a boundary formed by the radially outer area bent portion and the projecting portion.

2. The thrust roller bearing cage according to claim 1, wherein areas of the projecting portions which are to contact the end faces of the rollers have flat surfaces.

3. The thrust roller bearing cage according to claim 1, wherein the projecting portions project obliquely inward in the radial direction.

4. A method for manufacturing a thrust roller bearing cage included in a thrust roller bearing and including a plurality of pockets accommodating rollers, comprising the steps of:

preparing a cage material that will later become the thrust roller bearing cage;

forming an outer shape of the cage material so that the outer shape has portions that will later become projecting portions projecting inward in a radial direction from an inner peripheral edge of the radially outer area bent portion so as to contact end faces of the rollers accommodated in the pockets;

forming the pockets in the cage material so that radially outer edges of the pockets are located outside a boundary formed by the radially outer area bent portion and projecting portions; and forming a radially outer area bent portion by bending a radially outer edge part of an area of the cage material which is located radially outside the pockets obliquely inward in the radial direction, the radially outer area bent portion extending continuously in an annular shape and including the projection portions, the projecting portions projecting inward in a radial direction from an inner peripheral edge of the radially outer area bent portion so as to contact the end faces of the rollers accommodated in the pockets, the radially outer edges of the pockets being located outside the boundary formed by the radially outer area bent portion and projecting portions.

5. The method for manufacturing the thrust roller bearing cage according to claim 4, further comprising the step of:

press-flattening areas of the projecting portions which are to contact the end faces of the rollers.

6. A method for manufacturing a thrust roller bearing cage included in a thrust roller bearing and including a plurality of pockets accommodating rollers, comprising the steps of:

preparing a cage material that will later become a cage;

forming an outer shape of the cage material so that the outer shape has portions that will later become projecting portions projecting inward in a radial direction so as to contact end faces of rollers accommodated in the pockets;

forming the pockets in the cage material so that radially outer edges of the pockets are located radially outside base end parts of the projecting portions; and forming a radially outer area bent portion by bending an area of the cage material which is located radially outside the pockets inward in the radial direction, the outer area bent portion including the projecting portions, and press-flattening areas of the projecting portions which are to contact the end faces of the rollers.

* * * * *